US012663280B1

(12) United States Patent
Mu et al.

(10) Patent No.: US 12,663,280 B1
(45) Date of Patent: Jun. 23, 2026

(54) PREDICTIVE UTILIZATION OF PHYSICAL RESOURCES

(71) Applicant: Amazon Technologies, Inc., Seattle, WA (US)

(72) Inventors: Wei Mu, Sammamish, WA (US); Bryan Maybee, Maple Valley, WA (US); Meltem Ozen, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/093,614

(22) Filed: Mar. 28, 2025

(51) Int. Cl.
G06Q 10/083 (2024.01)
G01C 21/00 (2006.01)
G01C 21/34 (2006.01)

(52) U.S. Cl.
CPC ....... G01C 21/3492 (2013.01); G01C 21/387 (2020.08); G06Q 10/083 (2013.01)

(58) Field of Classification Search
None
See application file for complete search history.

(56) References Cited

U.S. PATENT DOCUMENTS

2008/0004789 A1 * 1/2008 Horvitz ............... G08G 1/0104
340/936

OTHER PUBLICATIONS

Budge, Susan, Armann Ingolfsson, and Dawit Zerom. "Empirical analysis of ambulance travel times: The case of Calgary emergency medical services." Management Science 56.4 (2010): 716-723 (Year: 2010).*

* cited by examiner

Primary Examiner — George Chen
(74) Attorney, Agent, or Firm — Kilpatrick Townsend & Stockton LLP

(57) ABSTRACT

Techniques for transportation speed prediction and transit time estimation are provided. In an example, a computer system generates a first input to a first machine learning model based on temporal information, road segment information, and attribute information for road segments in a geographic region. The computer system receives a first output of the first machine learning model. The first output indicates a predicted speed value associated with a road segment for a transportation resource. The computer system generates a second input to a second machine learning model based on the first input, the predicted speed value, and properties associated with a transportation load. The computer system receives a second output of the second machine learning model. The second output indicates a distribution of a time length for transporting the transportation load using the transportation resource. The second output is usable in deploying the transportation resource for transporting the transportation load.

20 Claims, 9 Drawing Sheets

501
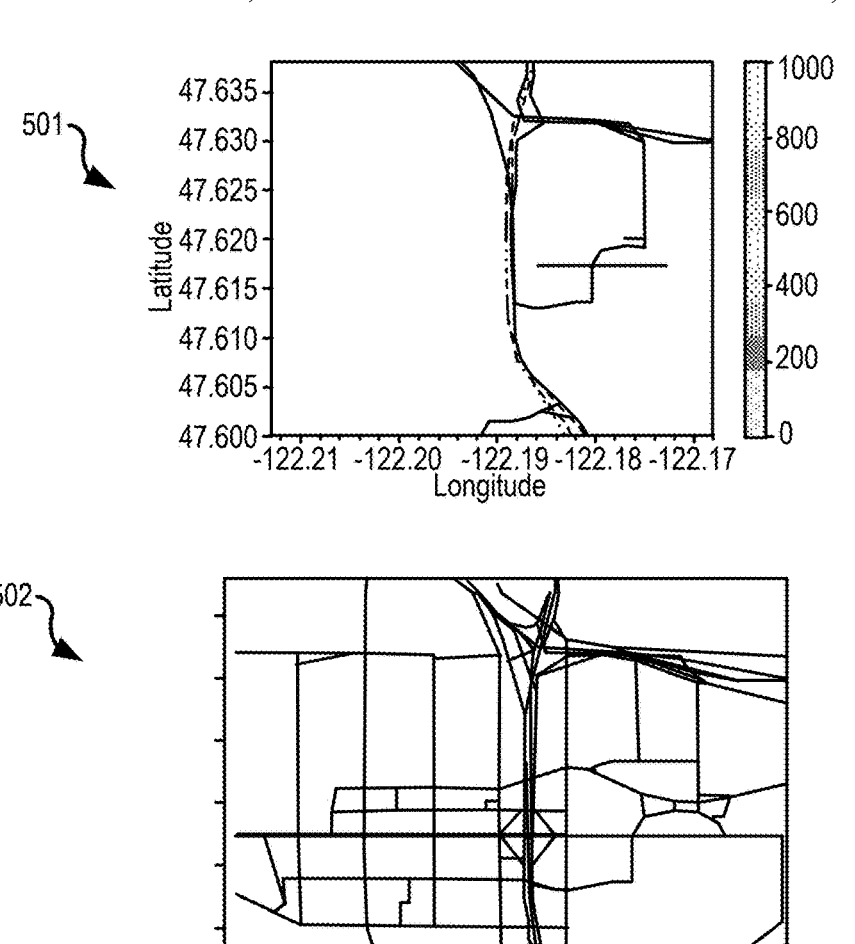
502
503
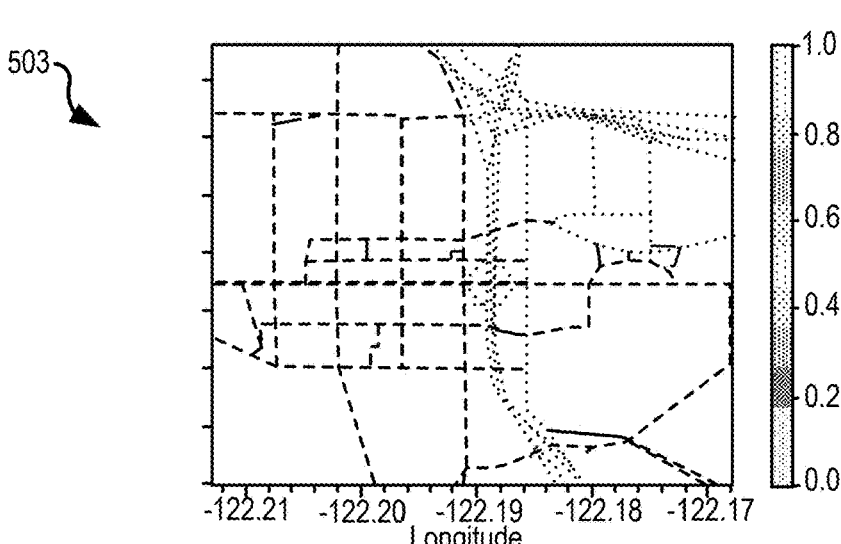
FIG. 5

600

<div style="border:1px solid">

602
RECEIVE AN INDICATION OF A ROUTE FOR A TRANSPORTATION LOAD INDICATING AN ORIGIN LOCATION AND A DESTINATION LOCATION

</div>

↓

<div style="border:1px solid">

604
USE A FIRST MACHINE LEARNING MODEL TO DETERMINE ROAD SEGMENTS ASSOCIATED WITH THE ORIGIN LOCATION AND THE DESTINATION LOCATION

</div>

↓

<div style="border:1px solid">

606
USE A SECOND MACHINE LEARNING MODEL TO DETERMINE PREDICTED SPEED VALUES FOR THE ROAD SEGMENTS

</div>

↓

<div style="border:1px solid">

608
USE A THIRD MACHINE LEARNING MODEL TO DETERMINE A TIME LENGTH FOR TRANSPORTING THE TRANSPORTATION LOAD

</div>

↓

<div style="border:1px solid">

610
CAUSE A TRANSPORTATION RESOURCE TO BE DEPLOYED BASED ON THE TIME LENGTH

</div>

FIG. 6

700

---

702
Generate a first input to a first machine learning model based at least in part on temporal information, road segment information, and attribute information for a plurality of road segments in a geographic region

---

704
RECEIVE A FIRST OUTPUT OF THE FIRST MACHINE LEARNING MODEL BASED AT LEAST IN PART ON THE FIRST INPUT AND INDICATING A PREDICTED SPEED VALUE

---

706
GENERATING A SECOND INPUT TO A SECOND MACHINE LEARNING MODEL BASED AT LEAST IN PART ON THE FIRST INPUT, THE PREDICTED SPEED VALUE, AND ONE OR MORE PROPERTIES ASSOCIATED WITH A TRANSPORTATION LOAD

---

708
RECEIVE A SECOND OUTPUT OF THE SECOND MACHINE LEARNING MODEL BASED AT LEAST IN PART ON THE SECOND INPUT AND INDICATING A DISTRIBUTION OF A TIME LENGTH FOR TRANSPORTING THE TRANSPORTATION LOAD USING THE TRANSPORTATION RESOURCE

PREDICTIVE UTILIZATION OF PHYSICAL RESOURCES

BACKGROUND

An operator may manage a network of physical resources to provide an online service. For example, a network of delivery vehicles can be operated to transport items between locations in response to one or more requests for items. Network underutilization or overutilization may occur when such physical resources are used.

BRIEF DESCRIPTION OF THE DRAWINGS

Various embodiments in accordance with the present disclosure will be described with reference to the drawings, in which:

FIG. 5 illustrates an example of improved speed value determination using a machine learning model, according to at least one example;

FIG. 6 illustrates an example flowchart showing a process for implementing techniques relating to route planning using transportation speed predictions and transit time estimation, according to at least one example;

FIG. 7 illustrates an example flowchart showing a process for implementing techniques relating to transportation speed prediction and transit time estimation, according to at least one example;

DETAILED DESCRIPTION

Figure 1:
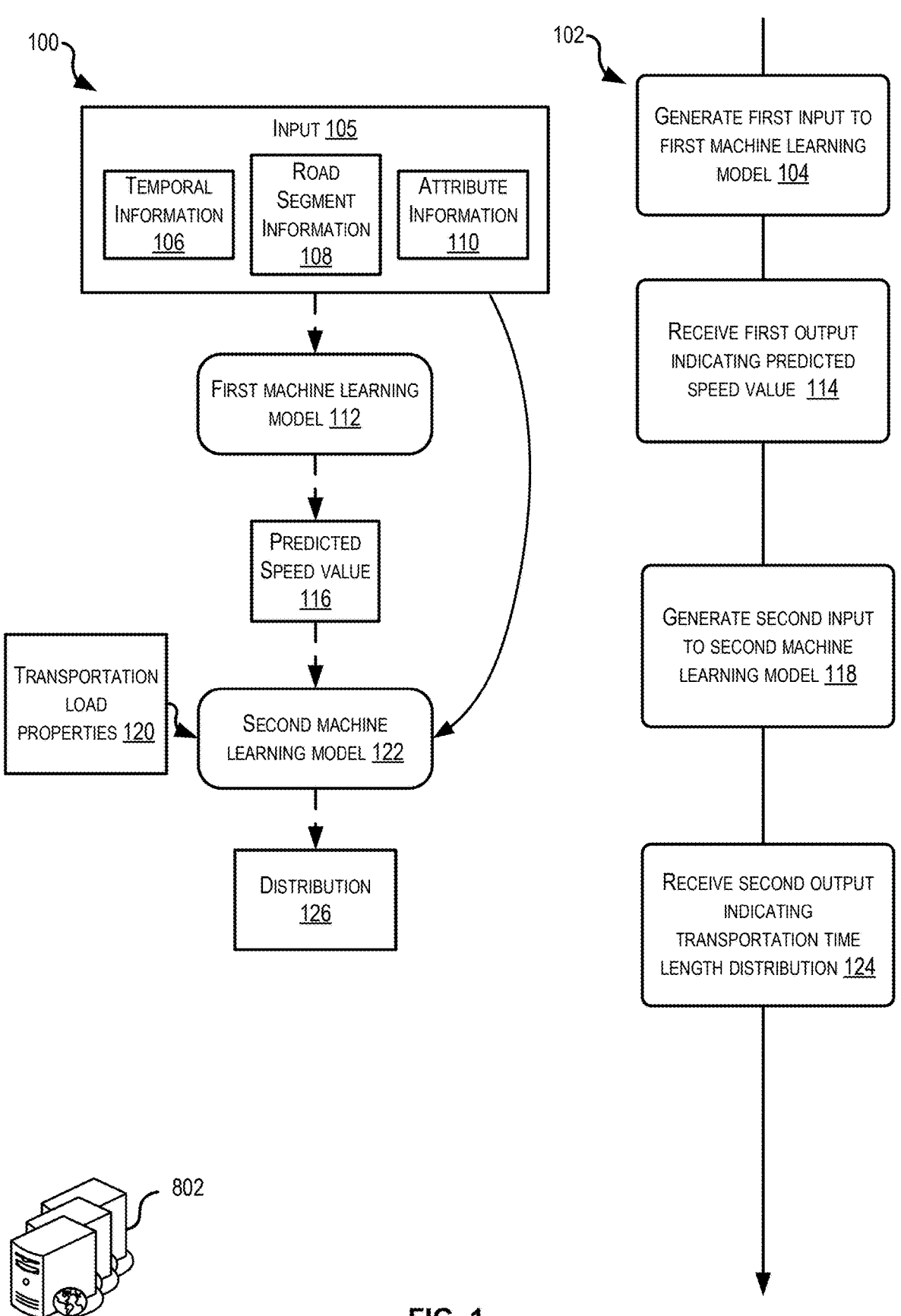
FIG. 1 illustrates an example block diagram and associated flowchart showing a process for implementing techniques relating to transportation speed prediction and travel time estimation, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, determining transportation speed predictions and transit time estimations for transporting loads from one location to another. A transportation network includes physical resources such as facilities, segments that connect the facilities, and transportation resources (e.g., vehicles) that transport items between the facilities by traveling along the segments. Loads may include items ordered by users. Loads may originate at a warehouse or other facility and travel to other facilities (e.g., sort facilities) before items are ultimately delivered to a delivery location of a user. The transportation of loads between facilities may be referred to as middle mile transit, and the transportation of items from loads to delivery locations may be referred to as last mile transit. A delivery time for an item may be provided at the time that a user places an order for the item. The delivery time can be calculated based on a time required for the order to traverse a series of facilities and a time required to travel from a last facility to the delivery location. As such, the delivery time is based on a middle mile transit time and a last mile transit time. Transit time represents the time required for an item to travel from one facility to another, considering the vehicle type on which it is carried. To meet the provided delivery date, items need to arrive on time at each stage in their journey so that they can be processed and loaded onto vehicles for movement on the next stage. A late delivery may disrupt the flow, leading to a decreased user experience. Therefore, middle mile transit times need to be accurate to maintain on-time arrival since overly conservative transit time predictions may reduce a speed of the network and underutilize the network.

In an example, the embodiments of the present disclosure provide a computer system that accurately predicts transit time for transportation vehicles. The computer system may provide distributional drive time predictions for any given origin-destination pairs in the middle-mile network. To do so, the computer system can use geographic data, represented by a source map, for a geographic region. The geographic data may be specific to the middle mile network and may exclude road segments inaccessible to delivery vehicles. The geographic data can be transformed into a graph model for routing and edge embedding generation. In addition, positioning data (e.g., Global Positioning System (GPS) data from transportation resources) can be mapped to road segments in the graph model. The computer system uses the geographic data and the positioning data to train a first machine learning model to learn traffic patterns and generate speed value predictions for road segments in the geographic region. The computer system then uses a second machine learning model to generate the distributional drive time predictions based on the speed value predictions.

To illustrate, consider an example of a system determining how to transport various loads of items from various origins to various destinations. For instance, a load may be transported from a facility in New York City to a facility in Las Vegas. The system can determine road segments along a route from the facility in New York to the facility in Las Vegas. The system can then generate embeddings representing temporal information, road segment information, and attribute information based on the road segments of the route. The temporal information may indicate times during which the load may be transported based on the load needing to arrive at the facility in Las Vegas by 5:00 PM on Friday of the twenty-second week of the year. The attribute information may indicate which of the road segments are highway roads and which of the road segments are residential roads. The road segment information can encode features of the road segments. A transformer encoder model receives the embeddings and generates predicted speed values for the road segments of the route. Then, a second machine learning model receives the embeddings, the predicted speed values, and additional properties for the load, such as a weight of the load and a type of the transportation vehicle. The second machine learning model outputs a distribution of a time length for transporting the load using the route. The time length can specifically represent a drive time of the transportation vehicle to transport the load. Based on a percentile value in the distribution, a time to deploy the load can be determined to ensure that the load arrives at the facility in Las Vegas by the desired time.

Embodiments of the present disclosure provide several technical advantages over conventional transportation transit time estimation techniques. For instance, load transportation may be constrained by regulatory requirements (e.g., duty/driver time limits) and/or network topology (e.g., node locations, direction of loads, etc.), which introduce inefficiencies, such as underutilization of transportation resources, or lack of capacity, such as overutilization of transportation resources. Conventional techniques often provide a point-estimate of a drive time like Estimated Time of Arrival (ETA), which may not provide sufficient information to evaluate the trade-off between predicted delivery date risk and transportation costs. Conventional techniques may also provide inaccurate drive time predictions due to the limited data available for all road segments. In addition, conventional techniques often impose under-bias or overbias in the drive time predictions, leading to suboptimal usage of transportation resources. The embodiments provided use a machine learning model that generates accurate speed estimations even for road segments that lack direct historical data, considering both spatial relationships and temporal patterns. As a result, an accurate and comprehensive speed profile map for transportation vehicles covering the entire road network can be generated, offering insights for logistics and traffic management systems. By providing accurate speed predictions for all road segments, accurate transit time predictions can be provided, regardless of the availability of direct measurements. As such, the embodiments can enhance route optimization, resource usage, and overall transportation planning.

Turning now to the figures, FIG. 1 illustrates an example block diagram and associated flowchart showing a process for implementing techniques relating to transportation speed prediction and travel time estimation, according to at least one example.

The diagram 100 depicts devices, objects, and the like that correspond to the process 102. The process 102 can be performed by any suitable combination of hardware and/or software, as described herein.

FIGS. 1, 6, and 7 illustrate example flow diagrams showing respective processes 102, 600, and 700, as described herein. The processes 102, 600, and 700, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A transportation management engine 810 (FIG. 8) embodied in a computer system 802 (FIG. 8) and/or within a user device 804 (FIG. 8) may perform the process 102. Thus, while the description below is from the perspective of the computer system 802, the user device 804 may also perform the process 102 or portions of the process 102.

The process 102 may begin at block 104 by the computer system 802 generating a first input 105 to a first machine learning model 112. The first machine learning model 112 can be trained to generate predicted speed values for road segments of a geographic region. Details of the first machine learning model 112 and its training are further discussed herein below in FIG. 3. Each road segment can correspond to a straight-line path of a road that is continuous and feasible to drive on. So, a given road can be decomposed into one or more road segments. The geographic region may correspond to a route for transporting a transportation load, so the road segments can be associated with the route. The first input 105 to the first machine learning model 112 can be based on temporal information 106, road segment information 108, and attribute information 110 for the road segments in the geographic region. The temporal information 106 can be represented by a first set of embeddings indicating a time frame that the data represents. For example, the temporal information 106 may indicate a particular hour of a particular week in a year (e.g., tenth hour of the second day of the fifteenth week of the year). The road segment information 108 can be represented by a second set of embeddings. The road segment information 108 can represent information for individual road segments of the geographic region, where the embeddings for closer road segments have a higher cosine similarity. The attribute information 110 can be represented by a second set of embeddings indicating attributes of the road segments. For example, the attributes can include a population density associated with a road segment, a road class (e.g., highway, residential, etc.) of the road segment, a speed limit of the road segment, and the like. Embeddings for other information can also be included in the first input 105. For example, embeddings related to vehicle information (e.g., engine type for maximum safe speed, trailer size, trailer weight, carrier company, etc.), traffic pattern information (e.g., weather, holidays, events, visibility, etc.), and topography information (e.g., topology, path curvature, etc.), or any other suitable embeddings may be included in the first input 105. The computer system 802 can generate the first input 105 to the first machine learning model 112 by concatenating the first set of embeddings, the second set of embeddings, and the third set of embeddings.

The process 102 can continue at block 114 by the computer system 802 receiving a first output indicating a predicted speed value 116. The predicted speed value 116 generated by the first machine learning model 112 corresponds to a particular road segment. In this way, based on the temporal information 106, the road segment information 108, and the attribute information 110, the first machine learning model 112 is able to determine the predicted speed value 116 even if limited historical data for the road segment is available. The predicted speed value 116 can include a prediction for each road segment indicated in the first input 105, and each prediction can correspond to a particular hour within a year. The predicted speed value 116 may be a normalized speed value compared to a speed limit of the road segment. The speed limit may be a posted speed limit for the road segment or a determined safe speed for the road segment for a particular vehicle. That is, if the first machine learning model 112 determines that the predicted speed value of a particular road segment is fifty-five miles per hour (MPH) and that the speed limit of the road segment is sixty MPH, then the predicted speed value 116 can be 0.917.

The process 102 can continue at block 118 by the computer system 802 generating a second input to a second machine learning model 122. The second machine learning model 122 can be trained to generate distributions for time lengths of transporting transportation loads. Details of the second machine learning model 122 and its training are further discussed herein below in FIG. 4. The computer system 802 can generate the second input based on the predicted speed value 116 and transportation load properties 120 of a transportation load. The transportation load properties 120 can include one or more of a weight of the transportation load, a type of the transportation resource (e.g., box truck, commercial trailer truck, cargo van, etc.), or a type of the transportation load (e.g., containerized cargo, flatbed freight, intermodal freight, etc.), and the like. In some instances, the embeddings for the first input 105 can also be included in the second input.

The process 102 can continue at block 124 by the computer system 802 receiving a second output indicating a transportation time length distribution. The transportation time length distribution is a distribution 126 of a time length for transporting the transportation load using a transportation resource. The distribution 126 can indicate percentile values for the time length, as well as other distribution parameters (e.g., mean, standard deviation, etc.) for the time length. As an example, the distribution 126 may indicate that the $85^{th}$ percentile of the time length for transporting the transportation load is one hour and the $92^{nd}$ percentile of the time length for transporting the transportation load is one hour and twenty minutes. In some instances, the second output may be a specific percentile value, or a set of percentile values determined from the distribution 126. The percentile value or the set of percentile values may be selected based on a priority of the transportation load. For example, if the transportation load properties 120 indicate that the transportation load has a high priority, and thus is more important to deliver on time, the selected percentile value may be higher than for transportation loads with lower priority. If the geographic region is associated with a particular route, then the distribution 126 can indicate the time length for the route. In addition, the distribution 126 may be associated with a particular hour within a year. That is, based on the second input, if the second machine learning model 122 receives the temporal information 106, the distribution 126 can be for the length of time for transporting the transportation load at a particular time window.

In an example, the distribution 126 can be used in deploying the transportation resource for transporting the transportation load. To do so, the computer system 802 can send a message to a deployment system for deploying the transportation resource. The message can include information that can be used by the deployment system to deploy the transportation resource. For example, the message may identify the transportation load and the transportation resource. The message may also indicate the distribution 126 (or a percentile from the distribution). In this way, the deployment system can manage load transportations based on their determined time lengths. For instance, using the distribution 126 and distributions determined for other transportation loads, the deployment system can determine how to build a combination of routes based on which transportation loads can be transported together.

Figure 2:
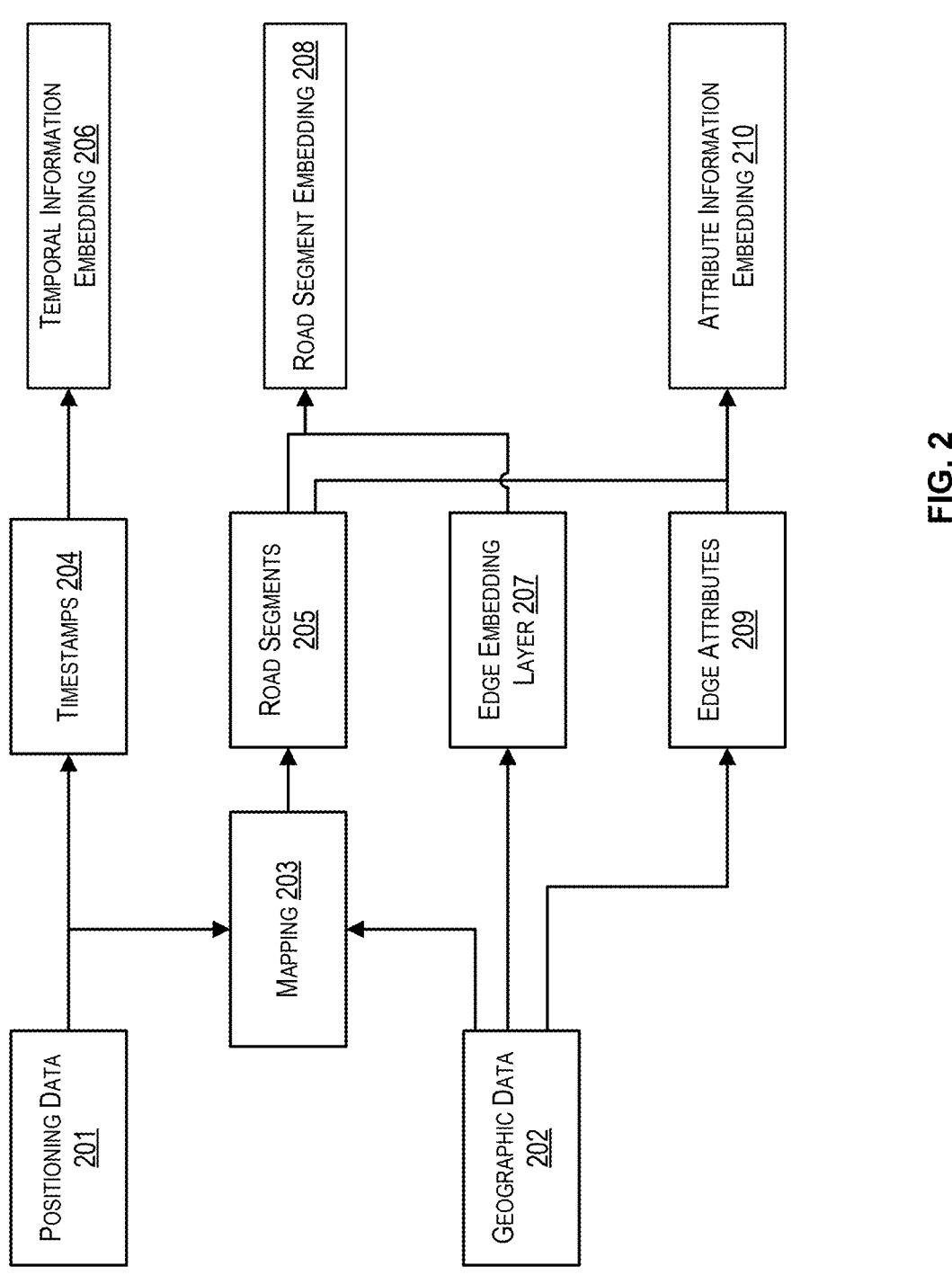
FIG. 2 illustrates an example of using positioning data and geographic data to generate embeddings for transit time prediction, according to at least one example.

FIG. 2 illustrates an example of using positioning data and geographic data to generate embeddings for transit time prediction, according to at least one example. Aspects of FIG. 2 can be performed by a computer system such as computer system 802 in FIG. 8.

In an example, the computer system can receive positioning data 201 associated with transportation resources. The positioning data 201 can include speed data, location data, and timestamp information for the transportation resources. The location data may be a latitude, a longitude, and an altitude. The positioning data 201 may also include telemetric data such as a signal strength (horizontal dilution of precision, a satellite count, etc.), in-motion information (e.g., Boolean), speed, heading direction (e.g., bearing), and accelerometer information in X, Y, Z direction. For example, the positioning data 201 may correspond to Global Positioning System (GPS) pings received from sensors of the transportation resources. The speed data, location data, and timestamp information can be extracted from the GPS pings. The GPS pings may be generated every thirty seconds.

Based on the positioning data 201, the computer system can determine a timestamp 204 for each GPS ping. That is, from the timestamp information included in the GPS ping, the timestamp 204 can be determined. The computer system can then generate a temporal information embedding 206 based on the timestamp. The temporal information embedding 206 can represent a week-of-year, day-of-week, hour-of-day using a cyclic sine and cosine embedding for each GPS ping.

The computer system can also receive geographic data 202 associated with the geographic region. The geographic data can be a graph with nodes that represent geographic locations in the geographic regions and edges that represent road segments connecting the geographic regions. The edges can be directed, indicating a path of travel along the road segment. Some edges may be unidirectional (e.g., for one-way roads), while others may be bidirectional. The graph model may be pruned to only include road segments likely to be accessed by a particular type of transportation resource (e.g., commercial truck), which can reduce a number of edges included in the graph model.

In an example, the computer system can use the geographic data 202 to generate a road segment embedding 208 and an attribute information embedding 210. For example, the computer system can generate a mapping 203 between the positioning data 201 and the road segments based on the location data included in the positioning data 201. So, the mapping 203 can indicate road segments 205 for GPS pings based on the location data of the GPS ping. In a particular example, the mapping can be performed with an open ball of radius set to sixty feet, which is equivalent to one side of an eight-lane highway. The radius may be chosen based on a maximum number on lanes on a highway (e.g., fifteen) and a lane width for the highway (e.g., twelve feet). In case where there are multiple road segments in the range, the computer system can use information of the road segments from the previous and the next GPS ping to ensure the path is valid. The selection of which road segment to include in the mapping 203 for a particular GPS ping can then be made based on a similarity in the type of road.

The computer system can also use the geographic data 202 to determine edge attributes 209 for the geographic region. The edge attributes 209 can indicate a type of road and population density for the edges in the graph model. In addition, the edge attributes 209 may indicate a road surface type (e.g., paved, unpaved, asphalt, etc,), a number of lanes, a speed limit based on equipment type, traffic control information (e.g., stop sign, traffic light, etc.), and other information (e.g., toll booth, ramp, etc.). Based on the road segments 205 and the edge attributes 209, the computer system can generate the attribute information embedding 210. The edge attributes 209 are mapped to the road segments 205 based on the mapping 203, so the attribute information embedding 210 represents the attributes of the road segments for individual GPS pings.

In some examples, the computer system can use the road segments 205 and an edge embedding layer 207 to generate the road segment embedding 208. The edge embedding layer 207 may be an algorithmic framework, such as node2vec, that generates edge embeddings. The computer system can input the geographic data 202 into the edge embedding layer 207. The edge embedding layer 207 can extracts a set of random walks from the geographic data 202 and then pass the sequence of road edges into a skip-gram model. Closer road segments can exhibit a higher cosine similarity in their edge embeddings. The dimension of the edge embedding can be set to two-hundred and fifty-six. The edge embeddings can be transformed into the road segment embedding 208 based on the road segments 205 determined from the mapping 203. So, the road segment embedding 208 represents the road segment information of the road segments for individual GPS pings.

Figure 3:
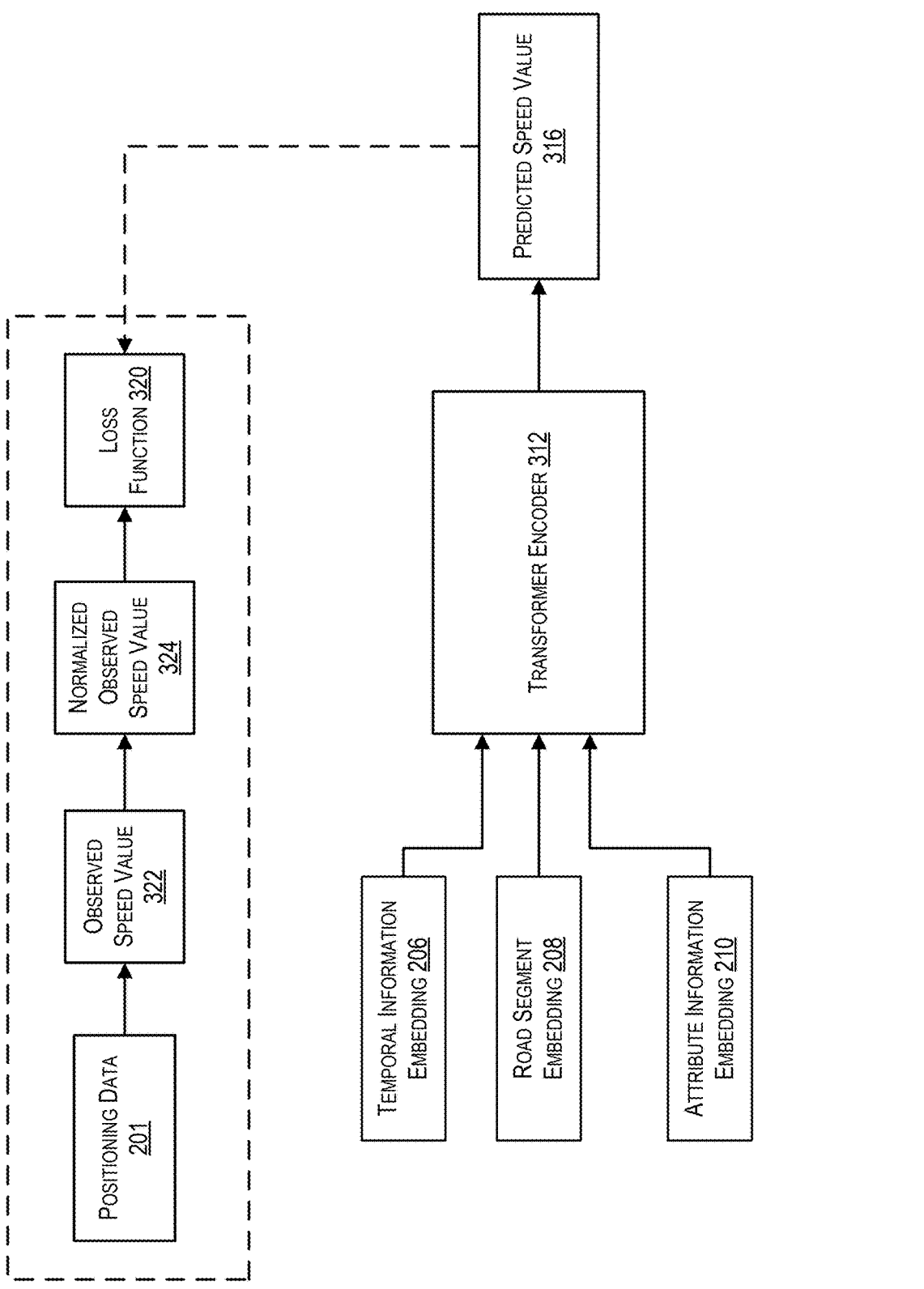
FIG. 3 illustrates an example of a machine learning model for speed value predictions, according to at least one example.

FIG. 3 illustrates an example of a machine learning model for speed value predictions, according to at least one example. The machine learning model is illustrated as a transformer encoder 312, and is an example of the first machine learning model 112 in FIG. 1. The transformer encoder 312 can be an inductive graph transformer that can model the complex relationships between road segment speeds and time windows, capturing both spatial proximity and temporal patterns in transportation resource speeds. The transformer encoder 312 is employed to make inferences about the speeds of unseen road segments across all time frames. To do so, the transformer encoder 312 can leverage both structural information and raw attributes in the geographic data of FIG. 2.

The transformer encoder 312 receives an input that is generated based on the temporal information embedding 206, the road segment embedding 208, and the attribute information embedding 210 from FIG. 2. For example, the computer system can concatenate the temporal information embedding 206, the road segment embedding 208, and the attribute information embedding 210 into a tensor that is fed into the transformer encoder 312. The input may also include embeddings related to other information, such as weather information and vehicle information. The transformer encoder 312 then generates an output representing a predicted speed value 316 for a transportation resource. The transformer encoder 312 may be configured, based on its training, to increase a weight of the temporal information, the road segment information, and the attribute information for a set of road segments that are determined to be closer (e.g., have a higher cosine similarity) to a particular road segment at a particular time of a year. That is, since the temporal information embedding 206, the road segment embedding 208, and the attribute information embedding 210 each define an embedding space, the computer system can determine which road segments are close to a particular road segment in the embedding space and then increase the weight of at least one of the temporal information, the road segment information, or the attribute information for the close road segments. To balance model's capacity and the number of parameters, a three-encoder layer structure can be utilized. The outputs from the final encoder layer can be fed into a two-layer fully connected neural network with ReLU activation and a dropout ratio of 0.1 can be applied. The hidden layer dimension can be five-hundred and twelve. Other parameters for the transformer encoder 312 are also possible.

During training of the transformer encoder 312, the computer system can receive an observed speed value 322 for a road segment. The observed speed value 322 may be determined from the positioning data 201 in FIG. 2. The observed speed value 322 can be normalized based on a speed limit associated with the road segment to generate a normalized observed speed value 324. In addition, the predicted speed value 316 may be output as the normalized predicted speed value or may be normalized based on the road segment speed limit once output by the transformer encoder 312. A loss function 320 can be used to train the transformer encoder 312 to minimize an error between the observed speed value 322 and the predicted speed value 316 (or their corresponding normalized values). Because the transformer encoder 312 functions as a regression model, a mean square error (MSE) loss function can be used for the loss function 320.

Figure 4:
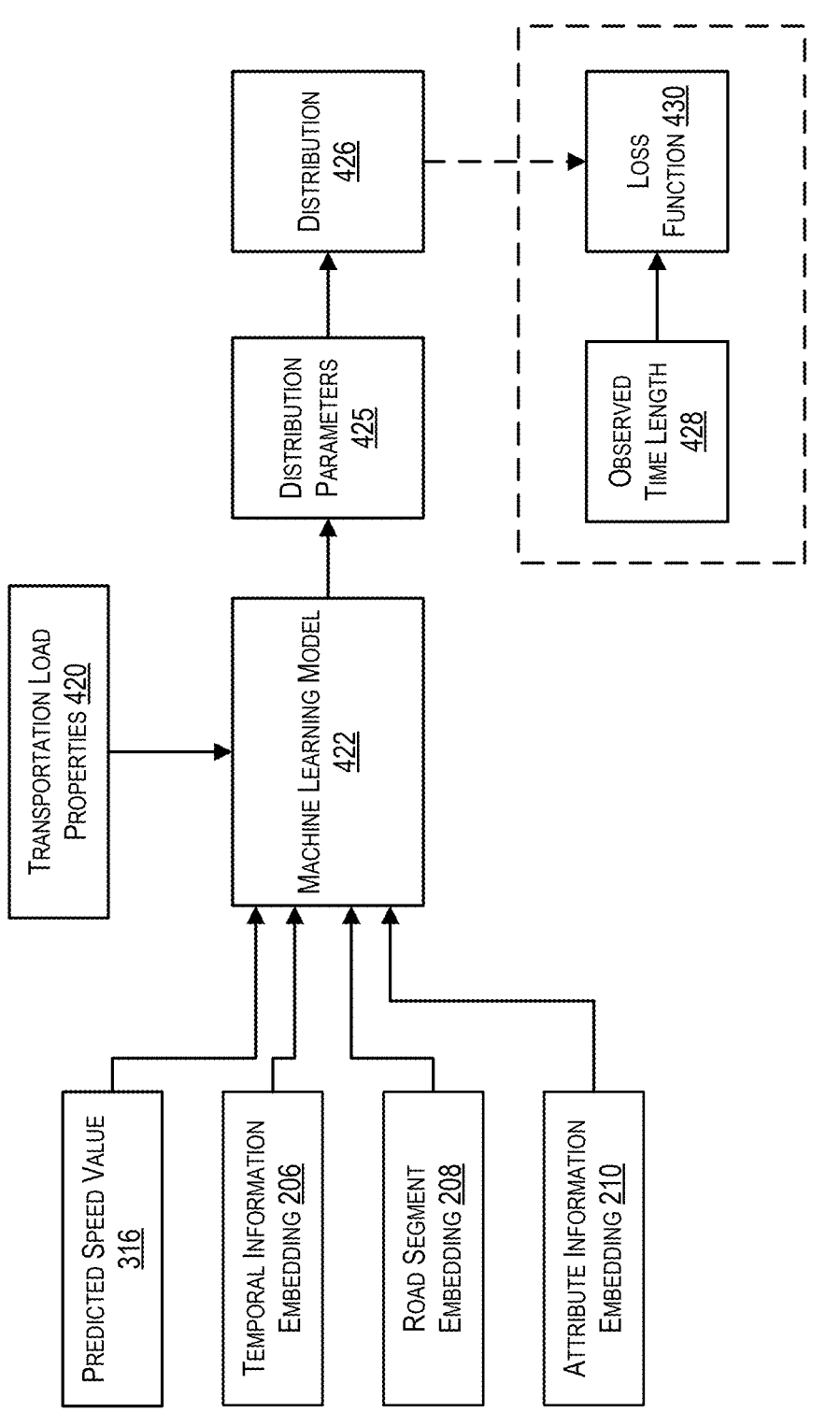
FIG. 4 illustrates an example of a machine learning model for speed value predictions, according to at least one example.

FIG. 4 illustrates an example of a machine learning model for speed value predictions, according to at least one example. The machine learning model 422 is an example of the second machine learning model 122 in FIG. 1. The machine learning model 422 can be a probabilistic regression model that can determine an impact of route attributes and predicted speed values on a distribution of a time length for transporting a transportation load. So, upon receiving the predicted speed value 316 from the transformer encoder 312 in FIG. 3, the computer system can generate an input to the machine learning model 422 based on the predicted speed value 316 and transportation load properties 420. The transportation load properties 420 include properties of a transportation load being transported, such as a weight of the transportation load, a type of the transportation load, or a type of the transportation resource transporting the transportation load. The input can also include the temporal information embedding 206, the road segment embedding 208, and the attribute information embedding 210, that were generated in FIG. 2, along with any other suitable embeddings. Based on the input, the machine learning model 422 outputs a distribution 426 for a time length for transporting the transportation load using a transportation resource. The machine learning model 422 may output distribution parameters 425 (e.g., mean, variance, standard deviation, etc.), from which the distribution 426 can be generated.

In an example, during training of the machine learning model 422, historical data from executed loads can be used to provide a comprehensive understanding of factors influencing drive time variability. In the training stage, the input matrix for the transformer encoder 312 and its corresponding output can be concatenated and aggregated based on the normalized speed value. Transportation load properties, such as program code and equipment type, can be numerically encoded using integer representation. Both vectors can be concatenated and fed into the machine learning model 422 as the input. The target variable is the drive time of the loads. So, the training can involve selecting a distribution (e.g., Gaussian, Gamma, etc.), determining distribution parameters 425 for a predicted distribution based on the selected distribution, determining the predicted distribution based on the distribution parameters 425, and minimizing a difference between the predicted distribution and an observed time length 428 of transporting a transportation load using a loss function 430. In some instances, the loss function 430 may be a negative log-likelihood function.

In an example, the machine learning model 422 may be a distributional gradient boost framework that assumes independent observations $y_i$ following the probability density function $f(y_i|\theta^i)$ conditional on $\theta^i=(\theta_{i1}, \theta_{i2}, \ldots)$, where $\theta^i$ represents the distributional parameters. Each parameter has an individual function to compute the parameter value from the input variables. Time lengths for transportations times can be modeled as distributions such as symmetric distributions like Gaussian, or long tailed distributions like Gamma distribution. In an example, Gaussian distribution may be chosen for superior performance and stability. Equations (1) and (2) below show how to fit the mean $\mu$ and variance $\sigma$ of Gaussian distribution respectively:

$$g_i(\mu) = X_1\beta_1 + \sum_{j=1}^{J_1} Z_{j1}Y_{j1} \qquad (1)$$

$$g_i(\sigma) = X_2\beta_2 + \sum_{j=1}^{J_2} Z_{j2}Y_{j2} \qquad (2)$$

where $X_k$, $Z_k$ represent fixed known design matrices, $\beta_k$ is the parameter vector of length $J_k$. The term $X_k\beta_k$ captures the epistemic uncertainty, representing the model's capability that diminishes with sufficient data. The random variable $\gamma_{ik}$ follows the underlying distribution, capturing aleatoric uncertainty reflecting inherent randomness in observation. The loss function used is negative log-likelihood (NLL), which is equivalent to the maximum likelihood estimation:

$$\mathrm{argmax}_\Theta\{L(\Theta)\} = \qquad (3)$$

$$\mathrm{argmin}_\Theta\{-\log(L(\Theta))\} = \mathrm{argmin}_W - \frac{1}{N}\sum_{i=1}^N \log(q(y_i|\Theta(W, X_i))).$$

FIG. 5 illustrates an example of improved speed value determination using a machine learning model, according to at least one example. Each of the graphs represents a single map grid in Bellevue, WA. The grid includes a portion of Interstate-405, which can be traversed by commercial transportation vehicles (e.g., 53-ft trailers) to transport loads. Graph 501 shows GPS pings on each road segment within the grid and graph 502 shows all road segments accessible to commercial transportation vehicles in the grid. As shown, GPS data is only available for 20.7% of the designated road segments. In addition, a majority of GPS signals concentrate on the I-405 highway, showing the limited coverage on other road segments and presenting challenges for accurate drive time predictions. Using a machine learning model, such as the first machine learning model 112 in FIG. 1 or the transformer encoder 312 in FIG. 3, can result in graph 503, which shows normalized speed value predictions for the grid. As can be seen, the machine learning model can predict speed values for all road segments shown in graph 502, even when GPS ping data is not available for the road segment.

FIG. 6 illustrates an example flowchart showing a process 600 for implementing techniques relating to route planning using transportation speed predictions and transit time estimation, according to at least one example. The transportation management engine 810 (FIG. 8) embodied in the computer system 802 (FIG. 8) and/or within the user device 804 (FIG. 8) may perform the process 600. Thus, while the description describes certain portions of the process from the perspectives of the computer system 802 and user device 804, the computer system 802 and the user device 804 may perform other portions of the process.

The process 600 may begin at block 602 by the computer system 802 receiving an indication of a route for a transportation load indicating an origin location and a destination location. The origin location and the destination location can be locations within a geographic region. The route may additionally include information related to the transportation load such as a time by which the transportation load is to be delivered, a day of a week that the transportation load is to be delivered, and the like.

The process 600 may continue at block 604 by the computer system 802 using a first machine learning model to determine road segments associated with the origin location and the destination location. The first machine learning model may be a router model, such as a shortest path algorithm. The first machine learning model can receive the indication of the route, along with geographic data (e.g., a graph model of the geographic region) and generate the road segments based on the route and geographic data.

The process 600 may continue at block 606 by the computer system 802 using a second machine learning model to determine predicted speed values for the road segments. Based on the route and the road segments, the computer system 802 can generate road segment information, temporal information, and attribute information for the route. Each of the road segment information, the temporal information, and the attribute information may be represented by an embedding. The second machine learning model can use the road segment information, the temporal information, and the attribute information to determine the predicted speed values for the road segments of the route.

The process 600 may continue at block 608 by the computer system 802 using a third machine learning model to determine a time length for transporting the transportation load. The third machine learning model can receive an input based on the predicted speed values, information related to the transportation load, and optionally the road segment information, the temporal information, and the attribute information. Based on the input, the third machine learning model outputs a distribution of the time length for transporting the transportation load using a transportation resource and the route.

The process 600 may continue at block 610 by the computer system 802 causing the transportation resource to be deployed based on the time length. The computer system 802 may send a message to a deployment system for deploying the transportation resource. The message may identify the transportation load and the transportation resource. The message may also indicate the time length. In this way, the deployment system can determine a time at which the transportation load is to be deployed such that the transportation load is delivered on time. The deployment system can then coordinate the deployment of the transportation load so that it is deployed at the time.

FIG. 7 illustrates an example flowchart showing a process 700 for implementing techniques relating to transportation speed prediction and transit time estimation, according to at least one example. The transportation management engine 810 (FIG. 8) embodied in the computer system 802 (FIG. 8) and/or within the user device 804 (FIG. 8) may perform the process 700. Thus, while the description describes certain portions of the process from the perspectives of the computer system 802 and user device 804, the computer system 802 and the user device 804 may perform other portions of the process.

The process 700 may begin at block 702 by the computer system 802 generating a first input 105 (FIG. 1) to a first machine learning model 112 (FIG. 1) based at least in part on temporal information 106 (FIG. 1), road segment information 108 (FIG. 1), and attribute information 110 (FIG. 1) for a plurality of road segments in a geographic region. The temporal information 106 can represent an hour of a day of a week within a year. The computer system 802 can receive positioning data 201 (FIG. 2) associated with a plurality of transportation resources. The positioning data 201 can include speed data, location data, and timestamp information for the plurality of transportation resources. In addition, the computer system 802 can receive geographic data 202 (FIG. 2) associated with the geographic region. The geographic data 202 can be a graph with nodes representing geographic locations in the geographic region and edges representing road segments connecting the geographic locations. The computer system 802 can generate, based at least in part on the positioning data 201, a first set of embeddings representing temporal information 106 of the positioning data 201. The computer system 802 can generate, based at least in part on the geographic data 202, a second set of embeddings representing the road segment information 108 of individual road segments of the plurality of road segments. The computer system 802 can generate, based at least in part on the geographic data 202, a third set of embeddings representing the attribute information 110 of the individual road segments. The computer system 802 may generate a mapping 203 (FIG. 2) between the positioning data 201 and the road segments based at least in part on the location data. The computer system 802 can generate the second set of embeddings and the third set of embeddings further based at least in part on the mapping 203. The computer system 802 can generate the first input 105 to the first machine learning model 112 based at least in part on the first set of embeddings, the second set of embeddings, and the third set of embeddings.

The process 700 may continue at block 704 by the computer system 802 receiving a first output of the first machine learning model 112 based at least in part on the first input 105 and indicating a predicted speed value 116 (FIG. 1). The predicted speed value 116 can be associated with a road segment of the plurality of road segments for a transportation resource. While generating the first output, the first machine learning model 112 can be configured to increase a weight of at least one of the temporal information 106, the road segment information 108, or the attribute information 110 for a set of road segments of the plurality of road segments that are closer to the road segment at a time of a year in an embedding space. The predicted speed value 116 may be a first predicted speed value. The computer system 802 can train the first machine learning model 112 by receiving an observed speed value for the road segment of the road segments, receiving, by the first machine learning model 112 and for the road segment, a training road segment information embedding, a training temporal information embedding, and a training attribute embedding, receiving, from the first machine learning model 112, a second predicted speed value for the road segment, and training the first machine learning model 112 to minimize an error between the observed speed value and the second predicted speed value. The first predicted speed value, the second predicted speed value, and the observed speed value can normalized with a speed limit of the road segment.

The process 700 may continue at block 706 by the computer system 802 generating a second input to a second machine learning model 122 (FIG. 1) based at least in part on the first input 105, the predicted speed value 116, and one or more properties 120 (FIG. 1) associated with a transportation load. The one or more properties 120 associated with the transportation load can include at least one of a weight of the transportation load, a type of the transportation resource, or a type of the transportation load. The second input can be further based at least in part on the first set of embeddings representing the temporal information 106, the second set of embeddings representing the road segment information 108, and the third set of embeddings representing the attribute information 110. The computer system 802 can train the second machine learning model 122 by determining distribution parameters 425 (FIG. 4) for a predicted distribution, determining the predicted distribution based at least in part on the distribution parameters 425, and minimizing a difference between the predicted distribution 425 and an observed time length 428 (FIG. 4) for transporting a load using a negative log-likelihood function.

The process 700 may continue at block 708 by the computer system 802 receiving a second output of the second machine learning model based at least in part on the second input and indicating a distribution 126 (FIG. 1) of a time length for transporting the transportation load using the transportation resource. The second output can be usable in deploying the transportation resource for transporting the transportation load. The second output can correspond to a percentile of the distribution 126, and the percentile can be selected based at least in part on a priority of the transportation load. The geographic region may be associated with a route for transporting the transportation load, so the second output can indicate the distribution 126 of the time length for the route. Additionally or alternatively, the distribution 126 can be associated with an hour an hour of a day of a week within a year. The computer system 802 can send a message to a deployment system for deploying the transportation resource. The message can include information for the deployment system to deploy the transportation resource for transporting the transportation load. The message can identify the transportation load and the transportation resource.

Figure 8:
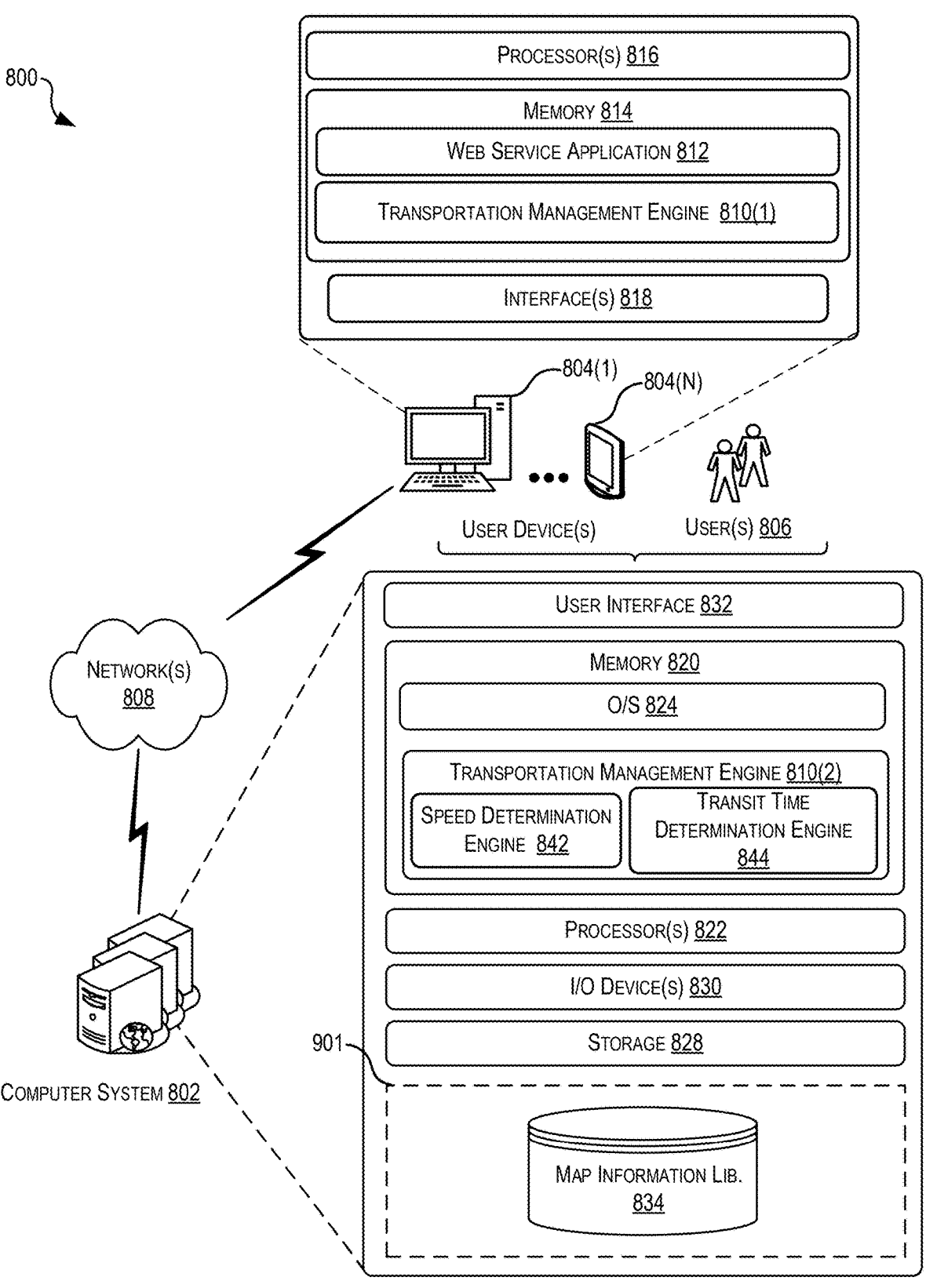
FIG. 8 illustrates an example schematic architecture for implementing techniques relating to transportation speed prediction and transit time estimation, according to at least one example.

FIG. 8 illustrates an example schematic architecture 800 for implementing techniques relating to transportation speed prediction and transit time estimation, according to at least one example. The architecture 800 may include a computer system 802 (e.g., the computer system described herein) in communication with one or more user devices 804(1)-804(N) via one or more networks 808 (hereinafter, "the network 808").

The user device 804 may be operable by one or more users 806 to interact with the computer system 802. The users 806 may be administrators, developers, or others that desire to test or utilize operations of the techniques described herein. The user device 804 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 804(1) is illustrated as a desktop computer, while user device 804(N) is illustrated as an example of a handheld mobile device.

The user device 804 may include a memory 814 and processor(s) 816. In the memory 814 may be stored program instructions that are loadable and executable on the processor(s) 816, as well as data generated during the execution of these programs. Depending on the configuration and type of user device 804, the memory 814 may be volatile (such as random access memory ("RAM")) and/or non-volatile (such as read-only memory (ROM), flash memory, etc.).

In some examples, the memory 814 may include a web service application 812 and a version of a transportation management engine 810 (e.g., 810(1)). The web service application 812 and/or the transportation management engine 810(1) may allow the user 806 to interact with the computer system 802 via the network 808. The user device 804 may also include one or more interfaces 818 to enable communication with other devices, systems, and the like. The transportation management engine 810, whether embodied in the user device 804 or the computer system 802, may be configured to perform the techniques described herein.

Turning now to the details of the computer system 802, the computer system 802 may include one or more computer system computers, perhaps arranged in a cluster of servers or as a server farm, and may host web service applications. The function of the computer system 802 may be implemented a cloud-based environment such that individual components of the computer system 802 are virtual resources in a distributed environment.

The computer system 802 may include at least one memory 820 and one or more processing units (or processor(s)) 822. The processor 822 may be implemented as appropriate in hardware, computer-executable instructions, software, firmware, or combinations thereof. Computer-executable instruction, software, or firmware implementations of the processor 822 may include computer-executable or machine-executable instructions written in any suitable programming language to perform the various functions described. The memory 820 may include more than one memory and may be distributed throughout the computer system 802. The memory 820 may store program instructions that are loadable and executable on the processor(s) 822, as well as data generated during the execution of these programs. Depending on the configuration and type of memory including the computer system 802, the memory 820 may be volatile (such as RAM and/or non-volatile (such as read-only memory ("ROM"), flash memory, or other memory)). The memory 820 may include an operating system 824 and one or more application programs, modules, or services for implementing the features disclosed herein including at least a version of the transportation management engine 810 (e.g., 810(2)). For example, the transportation management engine 810(2) may perform the functionality described herein.

The transportation management engine 810 includes a speed determination engine 842 and a transit time determination engine 844. In an example, the transportation management engine 810 can include any other suitable engines, modules, models, and the like.

The speed determination engine 842 can manage various tasks related to determining predicted speed values for road segments. In an example, the speed determination engine 842 may include one or more artificial intelligence models for determining the predicted speed values. The speed determination engine 842 may train the artificial intelligence models, ingest data into the artificial intelligence models, may transmit, or otherwise share output from the artificial intelligence models, and any other suitable tasks. In an example, the speed determination engine 842 may be the artificial models, may take the artificial intelligence inputs, and may output the artificial intelligence outputs relating to speed prediction. The segment determination engine 842 may be configured to receive road segment information, attribute information, and temporal information, determine predicted speed values based on the information, and/or perform other suitable tasks with respect to transportation data described herein.

The transit determination engine 844 can include one or more computer services for determining time lengths for transporting transportation loads based on the outputs generated by the speed determination engine 842. In an example, the transit time determination engine 844 may include one or more artificial intelligence models for determining distributions for the time lengths. The transit time determination engine 844 may train the artificial intelligence models, ingest data into the artificial intelligence models, may transmit, or otherwise share output from the artificial intelligence models, and any other suitable tasks. In an example, the transit time determination engine 844 may be the artificial models, may take the artificial intelligence inputs, and may output the artificial intelligence outputs relating to transit time prediction. The transit time determination engine 844 may receive outputs of the speed determination engine 842, may retrieve load data, may cause deployment of transportation resources, and any other suitable tasks.

The computer system 802 may also include additional storage 828, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 828, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 802 and/or part of the user device 804.

The computer system 802 may also include input/output (I/O) device(s) and/or ports 830, such as for enabling connection with a keyboard, a mouse, a pen, a voice input device, a touch input device, a display, speakers, a printer, or other I/O device.

In some examples, the computer system 802 may also include one or more user interface(s) 832. The user interface 832 may be utilized by an operator, curator, or other authorized user to access portions of the computer system 802. In some examples, the user interface 832 may include a graphical user interface, voice interfaces, web-based applications, programmatic interfaces such as APIs, or other user interface configurations.

The computer system 802 may also include a data store 801. In some examples, the data store 801 may include one or more databases, data structures, or the like for storing and/or retaining information associated with the computer system 802 and which, in some examples, may be accessible by the user devices 804. The transportation management engine 810 is communicatively coupled (e.g., via a wired connection or a wireless connection) to the data store 801. The data store 801 includes a map information library 834, which may include geographic data and positioning data. In an example, the data store 801 can include any other suitable data, databases, libraries, and the like.

Figure 9:
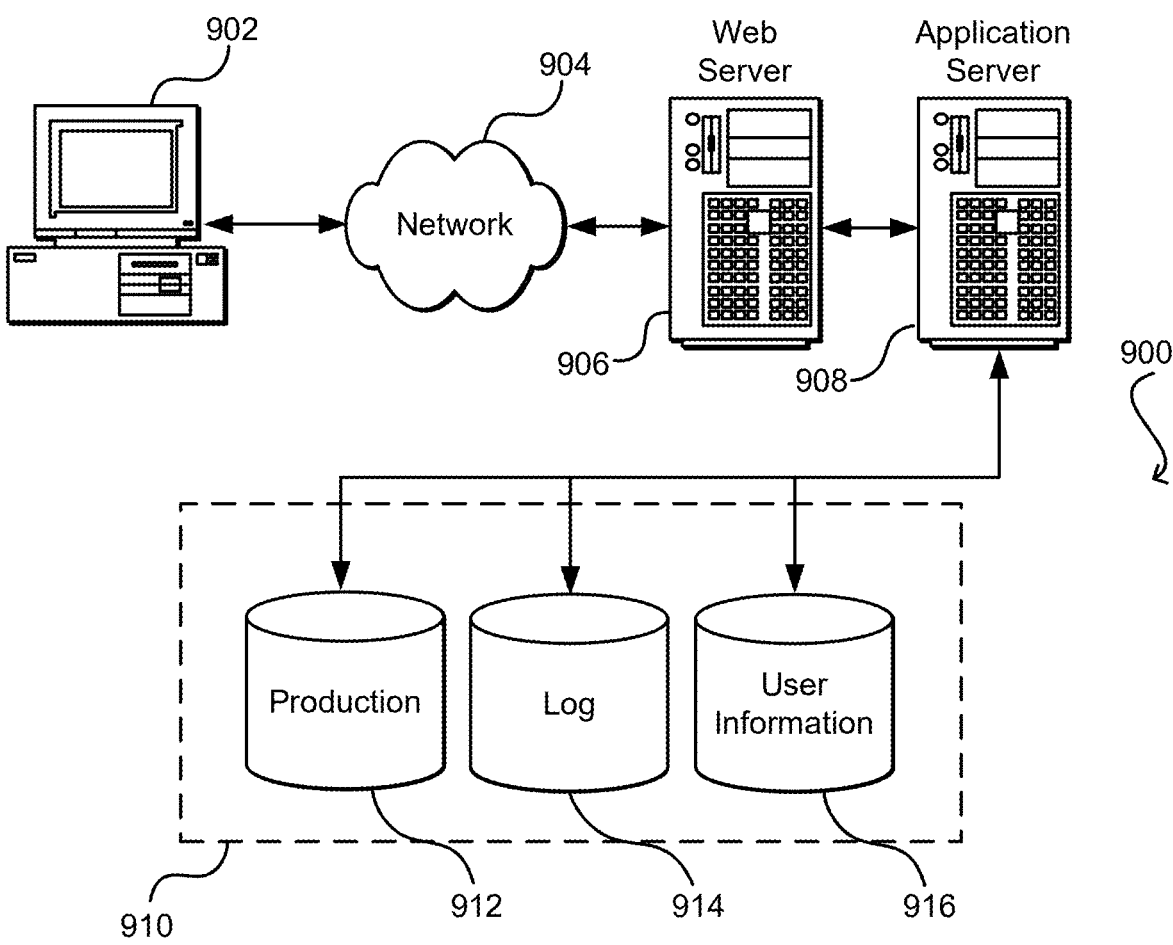
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving positioning data associated with a plurality of transportation resources, the positioning data including speed data, location data, and timestamp information for the plurality of transportation resources;

receiving geographic data associated with a geographic region, the geographic data being a graph with nodes representing geographic locations in the geographic region and edges representing road segments connecting the geographic locations;

generating, based at least in part on the positioning data, a first set of embeddings representing temporal information of the positioning data;

generating, based at least in part on the geographic data, a second set of embeddings representing road segment information of individual road segments of the road segments;

generating, based at least in part on the geographic data, a third set of embeddings representing attribute information of the individual road segments;

generating a first input to a first machine learning model based at least in part on the first set of embeddings, the second set of embeddings, and the third set of embeddings;

receiving a first output of the first machine learning model based at least in part on the first input, the first output indicating a first predicted speed value associated with a road segment of the road segments for a transportation resource;

generating a second input to a second machine learning model based at least in part on the first input, the first predicted speed value, and one or more properties associated with a transportation load; and receiving a second output of the second machine learning model based at least in part on the second input, the second output indicating a distribution of a time length for transporting the transportation load using the transportation resource, wherein the second output is usable in deploying the transportation resource for transporting the transportation load.

2. The computer-implemented method of claim 1, wherein training the first machine learning model comprises:

receiving an observed speed value for the road segment of the road segments;

receiving, by the first machine learning model and for the road segment, a training road segment information embedding, a training temporal information embedding, and a training attribute embedding;

receiving, from the first machine learning model, a second predicted speed value for the road segment; and training the first machine learning model to minimize an error between the observed speed value and the second predicted speed value.

3. The computer-implemented method of claim 2, wherein the first predicted speed value, the second predicted speed value, and the observed speed value are normalized with a speed limit of the road segment.

4. The computer-implemented method of claim 1, further comprising:

generating a mapping between the positioning data and the road segments based at least in part on the location data; and generating the second set of embeddings and the third set of embeddings further based at least in part on the mapping.

5. One or more non-transitory computer-readable media comprising computer-executable instructions that, when executed by one or more computer systems, cause the one or more computer systems to perform operations comprising:

generating a first input to a first machine learning model based at least in part on temporal information, road segment information, and attribute information for a plurality of road segments in a geographic region;

receiving a first output of the first machine learning model based at least in part on the first input, the first output indicating a predicted speed value associated with a road segment of the plurality of road segments for a transportation resource;

generating a second input to a second machine learning model based at least in part on the first input, the predicted speed value, and one or more properties associated with a transportation load; and receiving a second output of the second machine learning model based at least in part on the second input, the second output indicating a distribution of a time length for transporting the transportation load using the transportation resource, wherein the second output is usable in deploying the transportation resource for transporting the transportation load.

6. The one or more non-transitory computer-readable media of claim 5, further comprising additional computer-executable that instructions that, when executed by the one or more computer systems, cause the one or more computer systems to perform additional operations comprising:

receiving positioning data associated with a plurality of transportation resources, the positioning data including speed data, location data, and timestamp information for the plurality of transportation resources; and receiving geographic data associated with the geographic region, the geographic data being a graph with nodes representing geographic locations in the geographic region and edges representing road segments connecting the geographic locations.

7. The one or more non-transitory computer-readable media of claim 6, further comprising additional computer-executable that instructions that, when executed by the one or more computer systems, cause the one or more computer systems to perform additional operations comprising:

generating, based at least in part on the positioning data, a first set of embeddings representing the temporal information of the positioning data;

generating, based at least in part on the geographic data, a second set of embeddings representing the road segment information of individual road segments of the plurality of road segments; and generating, based at least in part on the geographic data, a third set of embeddings representing the attribute information of the individual road segments.

8. The one or more non-transitory computer-readable media of claim 5, wherein, while generating the first output, the first machine learning model is configured to increase a weight of at least one of the temporal information, the road segment information, or the attribute information for a set of road segments of the plurality of road segments that are closer to the road segment at a time of a year in an embedding space.

9. The one or more non-transitory computer-readable media of claim 5, wherein the temporal information represents an hour of a day of a week within a year.

10. The one or more non-transitory computer-readable media of claim 5, wherein the one or more properties associated with the transportation load comprise at least one of a weight of the transportation load, a type of the transportation resource, or a type of the transportation load.

11. The one or more non-transitory computer-readable media of claim 5, further comprising additional computer-executable that instructions that, when executed by the one or more computer systems, cause the one or more computer systems to perform additional operations comprising training the second machine learning model by:

determining distribution parameters for a predicted distribution;

determining the predicted distribution based at least in part on the distribution parameters; and minimizing a difference between the predicted distribution and an observed time length for transporting a load using a negative log-likelihood function.

12. The one or more non-transitory computer-readable media of claim 5, wherein the second output corresponds to a percentile of the distribution, and wherein the percentile is selected based at least in part on a priority of the transportation load.

13. A system, comprising:

one or more memories configured to store computer-executable instructions;

one or more processors configured to access the one or more memories and execute the computer-executable instructions to at least:

generate a first input to a first machine learning model based at least in part on temporal information, road segment information, and attribute information for a plurality of road segments in a geographic region;

receive a first output of the first machine learning model based at least in part on the first input, the first output indicating a predicted speed value associated with a road segment of the plurality of road segments for a transportation resource;

generate a second input to a second machine learning model based at least in part on the first input, the predicted speed value, and one or more properties associated with a transportation load; and receive a second output of the second machine learning model based at least in part on the second input, the second output indicating a distribution of a time length for transporting the transportation load using the transportation resource, wherein the second output is usable in deploying the transportation resource for transporting the transportation load.

14. The system of claim 13, wherein the one or more processors are configured to access the one or more memories and execute additional computer-executable instructions to at least:

receive positioning data associated with a plurality of transportation resources, the positioning data including speed data, location data, and timestamp information for the plurality of transportation resources; and receive geographic data associated with the geographic region, the geographic data being a graph with nodes representing geographic locations in the geographic region and edges representing road segments connecting the geographic locations.

15. The system of claim 14, wherein the one or more processors are configured to access the one or more memories and execute additional computer-executable instructions to at least:

generate, based at least in part on the positioning data, a first set of embeddings representing the temporal information of the positioning data;

generate, based at least in part on the geographic data, a second set of embeddings representing the road segment information of individual road segments of the plurality of road segments; and generate, based at least in part on the geographic data, a third set of embeddings representing the attribute information of the individual road segments.

16. The system of claim 13, wherein the geographic region is associated with a route for transporting the transportation load, and wherein the second output indicates the distribution of the time length for the route.

17. The system of claim 13, wherein the first input comprises a first set of embeddings representing the temporal information, a second set of embeddings representing the road segment information, and a third set of embeddings representing the attribute information.

18. The system of claim 13, wherein the distribution is associated with an hour an hour of a day of a week within a year.

19. The system of claim 13, wherein the one or more processors are configured to access the one or more memories and execute additional computer-executable instructions to at least:

send a message to a deployment system for deploying the transportation resource, wherein the message includes information for the deployment system to deploy the transportation resource for transporting the transportation load, and wherein the message identifies the transportation load and the transportation resource.

20. The system of claim 13, wherein the one or more processors are configured to access the one or more memories and execute additional computer-executable instructions to at least:

generate a mapping between positioning data associated with a plurality of transportation resources and the plurality of road segments based at least in part on location data of the positioning data; and generate the road segment information and the attribute information based at least in part on the mapping.

* * * * *